(12) United States Patent
Forrest, Jr.

(10) Patent No.: US 7,552,500 B2
(45) Date of Patent: Jun. 30, 2009

(54) RAISED PLATEN FOR FIBER OPTIC COMPONENT CLEANING DEVICE

(75) Inventor: Edward J. Forrest, Jr., Marietta, GA (US)

(73) Assignee: Illinois Tool Works Inc., Glenview, IL (US)

( * ) Notice: Subject to any disclaimer, the term of this patent is extended or adjusted under 35 U.S.C. 154(b) by 694 days.

(21) Appl. No.: 10/994,929

(22) Filed: Nov. 22, 2004

(65) Prior Publication Data

US 2006/0107479 A1    May 25, 2006

(51) Int. Cl.
 *B08B 1/00* (2006.01)
(52) U.S. Cl. .................................. 15/210.1; 15/231
(58) Field of Classification Search ............. 15/209.1, 15/210.1, 231; 206/389, 395, 409, 494
See application file for complete search history.

(56) References Cited

U.S. PATENT DOCUMENTS

| 579,850 | A |   | 3/1897  | Uhlmann        |         |
|---------|---|---|---------|----------------|---------|
| 1,848,859 | A |   | 3/1932  | Wishart        |         |
| 2,585,061 | A |   | 2/1952  | Webster, Jr.   |         |
| 2,880,442 | A |   | 4/1959  | Shelby         |         |
| 3,465,377 | A | * | 9/1969  | Thomas         | 15/147.1 |
| 3,613,146 | A |   | 10/1971 | Oviatt         |         |
| 4,101,026 | A |   | 7/1978  | Bonk           |         |
| 4,152,803 | A |   | 5/1979  | Gersin et al.  |         |
| 4,171,047 | A |   | 10/1979 | Doyle et al.   |         |
| 4,207,646 | A | * | 6/1980  | Osborne        | 15/224  |
| 4,306,687 | A |   | 12/1981 | Hadtke         |         |
| 4,333,979 | A |   | 6/1982  | Sciaraffa et al.|        |
| 4,741,944 | A |   | 5/1988  | Jackson et al. |         |
| 4,873,728 | A |   | 10/1989 | Bono           |         |

(Continued)

FOREIGN PATENT DOCUMENTS

AU           527032        10/1983

(Continued)

OTHER PUBLICATIONS

"A More Effective Means of Cleaning Fiber Optic Connections in Outside Plant, FTTH and OEM Applications", Ed Forrest, ITW Chemtronics, provided website link is www.chemtronics.com/pdf/upload/A%20More%20Effective%20Means%20of%20Cleaning%20-%20White%20Paper-3%20rev.pdf.

(Continued)

*Primary Examiner*—Mark Spisich
(74) *Attorney, Agent, or Firm*—Mark W. Croll; Donald J. Breh; Levenfeld Pearlstein, LLC

(57) ABSTRACT

A cleaning device is configured for cleaning a male portion of an aligning-type fiber optic connector. The device includes a container having an opening in a face formed in a side of the container. A plurality of discrete soft, large work surfaces are disposed on a face formed in a side of the container. The surfaces are disposed in side-by-side relation to one another having open regions between the surfaces. The open regions are at an elevation lower than an elevation of the plurality of work surfaces. A plurality of cleaning wipes are located inside the container. The wipes are fed from the inside of the container through the opening and placed on the work surface for cleaning the connector.

9 Claims, 2 Drawing Sheets

U.S. PATENT DOCUMENTS

| | | |
|---|---|---|
| 5,220,703 A | 6/1993 | Kanayama et al. |
| 5,605,749 A | 2/1997 | Pike et al. |
| 5,656,361 A | 8/1997 | Vogt et al. |
| 5,874,160 A | 2/1999 | Keck |
| 6,098,239 A | 8/2000 | Vosbikian |
| 6,865,770 B2 | 3/2005 | Forrest |

FOREIGN PATENT DOCUMENTS

| | | |
|---|---|---|
| EP | 0982237 | 3/2000 |
| EP | 1065010 | 1/2001 |
| EP | 1384528 | 11/2004 |
| JP | 2003185883 | 11/2003 |
| TW | 382992 | 8/2001 |
| WO | WO 98/03713 | 1/1998 |
| WO | WO 00/56201 | 9/2000 |

OTHER PUBLICATIONS

"Fiber Optic Cleaning—Fiber Connector Cleaner", Fiber Optics for Sale Co., Complete Supply Solutions, information regarding fiber optic cleaning and fiber connector cleaners, provided website link is www.fiberoptics4sale.com/Merchant2/fiber-optic-cleaning.php.

"The Combination Cleaning Process (CCp TM)" information regarding the combination cleaning process of ITW Chemtronics, provided website link is http://www.chemtronics.com/pdf/upload/The%20Combination%20Cleaning%20Process.pdf.

"Fiber Optic Connectors" by Force, Inc., 2005, Information regarding parts, installation and cleaning and handling of fiber optic connectors, provided website link is www.fiber-optics.info/articles/connector-care.htm.

"Fiber Optic Cleaning Practices", Avici Systems, Inc., 2006, provided website link is avici.com/documentation/PDFDocs/06698-00_revAA.pdf.

* cited by examiner

RAISED PLATEN FOR FIBER OPTIC COMPONENT CLEANING DEVICE

BACKGROUND OF THE INVENTION

The present invention is directed to a fiber optic component cleaning device. More particularly, the present invention pertains to a fiber optic component cleaning device that is configured for cleaning fiber optic connectors having pin-type aligning elements.

Fiber optic transmission rates have increased from one gigabyte per second to a contemporary standard of ten gigabytes per second. Several networks predict transmission rates will reach forty gigabytes per second in the near future. Researchers are working to achieve transmission rates on the order of petabytes and terabytes per second.

In order to achieve, maintain, and even surpass these transmission rates, the transmission media (e.g., fiber optic conductors), must be fabricated and maintained to exacting standards and tolerances. During fabrication and manufacturing, and installation and testing, fiber optic component end faces frequently become contaminated with dirt, dust, oil, grease, and other debris. Cleaning the end faces preserves the accuracy of these very high-speed transmissions. In addition, the end faces of the conductors must be free of scratches, burrs, and the like to maintain the standards necessary for these high transmission rates. Moreover, soils and improper cleaning can also damage end face polish.

Various types of fiber optic connectors are known. Some of these connectors permit the joining of single optical fibers. Other types of connectors more efficiently permit the joining or connecting of multiple fibers in a single physical connector body. One type of connector, known as a small form factor (SFF) connector, in various configurations for multiple producers, includes a pair of block-like elements having opposing fiber optic end faces with multiple connecting channels. The block-like elements are aligned and mated to one another by aligning pin extending from one (male) connector body that insert or fit into a mating (female) connector. The end faces of these multiple fiber connectors and in particular the male end connectors (those connectors having) have proven to be somewhat more problematic in effectively cleaning.

Although many devices have been used to clean fiber optic end faces, they have met with differing degrees of success. Due to fibers and linting, paper products and like materials are avoided. Linting can be critical, as fibers obstructing an end face can cause loss of laser light transmission. Moreover, paper products cannot be used with a wet-cleaning technique in that the wetting products cause the paper materials to shred, exacerbating the linting problem.

Other cleaning devices include woven material enclosed within cartridge reels, exposing a very small portion of the reel as a cleaning surface. The extremely small size of these surfaces limits the cleaning process to short, small cleaning strokes. This method may result in damage to an end face, such as scratching. Moreover, the cartridge reel design does not allow for immediate disposal of the soiled cleaning surface. Instead, the dirty material is re-rolled back into the cartridge, potentially contaminating the unused material. In addition, these devices do not facilitate cleaning the end surfaces of SFF connectors.

Moreover, known, currently available cleaning devices cannot be used in conjunction with both dry and wet cleaning techniques, which are essential to effective end face cleaning. Wet cleaning requires a relatively large cleaning surface to allow a component to be drawn through a wet portion to a dry portion. The small cleaning surfaces area of existing devices does not provide sufficient area for both wet and dry sections. And, wet cleaning is impractical because winding wet cleaning material back into a cartridge can result in the contamination of the interior mechanism (and clean cleaning material) thus rendering such a device essentially useless.

Accordingly, there exists a need for a fiber optic cleaning device with a cleaning surface configured for cleaning small form factor connectors. Desirably, such a device leaves no residue on an end face and allows technicians to use a large cleaning stroke, with an integrated drying process, to reduce the likelihood of damaging an end face. Most desirably such a device also allows performance of both wet and dry cleaning techniques.

BRIEF SUMMARY OF THE INVENTION

A cleaning device is configured for cleaning a male portion of an aligning-type fiber optic connector, such as the male portion of a small form factor (SFF) connector. The cleaning device includes a container having an opening in a face of the container. In one embodiment, the container is box-shaped with a slot-shaped opening. Alternately, the container can be tubular having an opening on an end of the container. A plurality of discrete, soft work surfaces (formed as strip-like elements) are disposed on a face of the container. In a preferred embodiment, the discrete surfaces are disposed on a resilient work surface extending over substantially the face of the container. The discrete surfaces are disposed in side-by-side relation to one another with open regions between them.

A plurality of cleaning wipes are located inside the container. The wipes can be disposed on a roll and are fed from the inside of the container through the opening and placed on the work surface for cleaning. The cleaning wipes can be detachable from adjacent cleaning wipes as by perforating the wipes.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
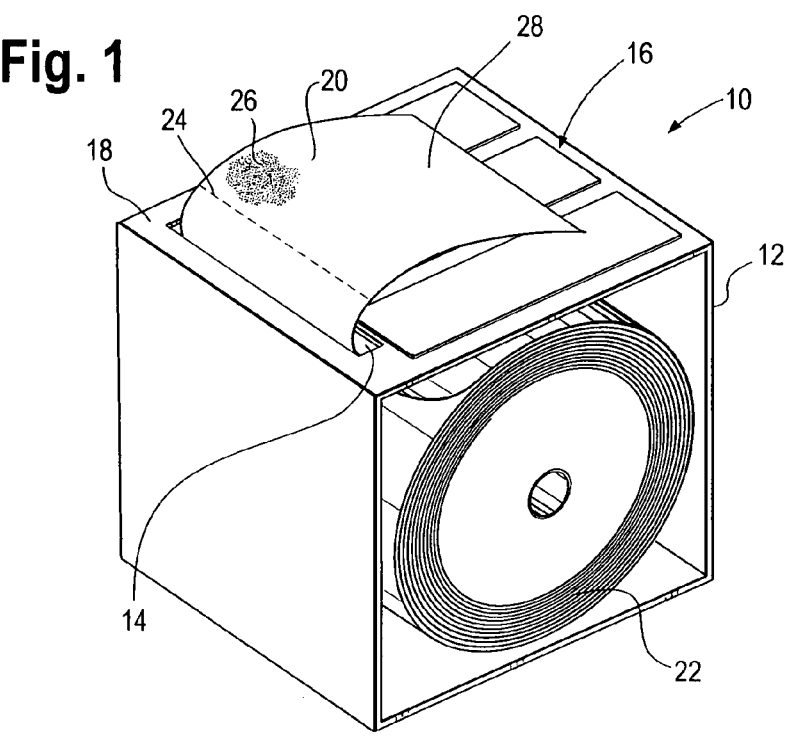
FIG. 1 is a perspective illustration of a device for cleaning fiber optic small form factor (SFF) connectors embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment, size or shape illustrated.

It should be further understood that the title of this section of this specification, namely, "Detailed Description Of The Invention", relates to a requirement of the United States Patent Office, and does not imply, nor should be inferred to limit the subject matter disclosed herein.

Referring to the figures and in particular FIG. 1, there is shown an embodiment of a fiber optic component cleaning device 10 in accordance with the principles of the present invention. The cleaning device 10 includes a container 12, having an opening 14 formed in a side (or top) or a panel thereof, a plurality of soft, large raised work surfaces 16a-c (collectively 16) on, in a present example, a face 18 of the container, and a plurality of cleaning wipes 20 located inside the container 12. The work surfaces 16a-c are formed as discrete, elongated, narrow strips (having the appearance of stripes) positioned on the container face 18.

Figure 2:
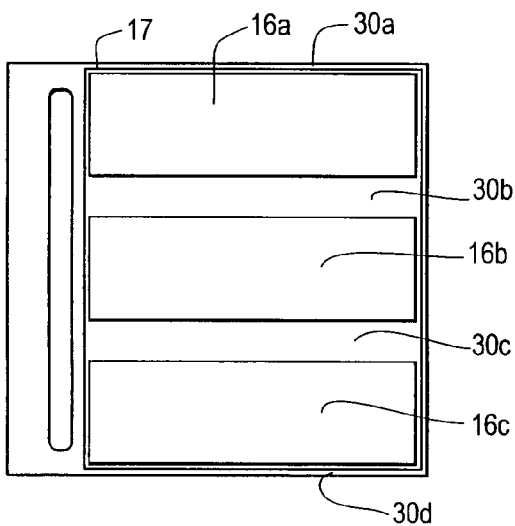
FIG. 2 is a top view of the cleaning device.

The cleaning wipes 20 are fed from the inside of the container 12 through the opening 14, and placed on the work surfaces 16 for cleaning. Preferably, the wipes 20 spool from the inside of the roll to further assure that the wipes 20 remain clean. In the embodiment shown in FIGS. 1-3, the container 12 is shaped as a box. The container 12 is preferably formed of paperboard, cardboard, molded plastic, or electrostatic discharging material. The container 12 can, of course, be formed from any other suitable material, as desired. As will be recognized by those skilled in the art, such a container 12 may be made to be disposable or refillable with wipes (as noted below).

In a present embodiment, the opening 14 is in a slot shape. The work surface 16 is located immediately next to the opening 14 on an adjacent panel 18 of the container 12. In a current embodiment, the work surfaces 16 are formed from a non-linting material. Preferably, the non-linting material used on the work surfaces 16 is a tight, closed cell material. An exemplary tight, closed cell material is the commonly available material neoprene.

Alternately, the work surfaces 16 can be formed from, for example, Buna-N (nitrile butyl rubber) vinyl or a like soft, resilient polymer. Essentially any soft, resilient material can be used. Desirable characteristics for the work surface include liquid impermeability and chemical/solvent resistance. To this end, the work surfaces 16 can be formed from a soft, resilient material having a protective layer adhered thereto or formed thereon, such as by forming a coextruded material or film. In an alternate configuration (see FIG. 4), the discrete surfaces 16a-c are positioned on top of a lower surface 17 that is formed from a material similar to that of the surfaces 16a-c.

In a current embodiment, the cleaning wipes 20 are placed on a roll 22. The cleaning wipes 20 have perforations 24, allowing used wipes to be torn from the roll 22 and discarded.

The present device 10 is specifically configured for use with small form factor (SFF) connectors illustrated generally at 50. These connectors 50, the male portion of one being illustrated in FIG. 3, include a block-shaped or block-like body 52 having a plurality of optical fibers 54 mounted therein. These fibers 54 require connection to a specific one of the fibers in the female portion of the connector (not shown). The fiber ends are formed on the end or face of the connector 50 (as indicated at 56 in FIG. 3 for the male connector and in a corresponding location on the female connector). In order to accomplish the connection and alignment, the male connector portion 50 includes a pair of aligning pins 58 that extend from the end or face 56 that insert into corresponding openings in the body of the female connector portion.

Although the pins 58 provide positive alignment of the male and female connector portions, they can also interfere with proper cleaning of the end face 56 of the male portion 50.

The present device 10 facilitates cleaning the optical connectors at the face 56 by providing non-cleaning surface areas or open areas 30a-d, on the sides of, and between the cleaning surfaces 16a-c. This forms the striped appearance of the cleaning surfaces 16a-c.

A method of cleaning a fiber optic component includes feeding a cleaning wipe 20 through the opening 14 in the container 12, placing the wipe 20 on the work surfaces 16, and drawing a fiber optic component 50 over the wipe 20.

As an alternative method of cleaning a fiber optic component, a portion 26 of the wipe 20 may be wetted, so that the component may be drawn from the wet portion 26 to a dry portion 28. The wet portion 26 may be wetted by spraying a solvent onto the wipe 20, and cleaning accomplished by moving the component 50 from the wet portion 26 to the dry portion 28 in an integrated procedure.

Figure 3:
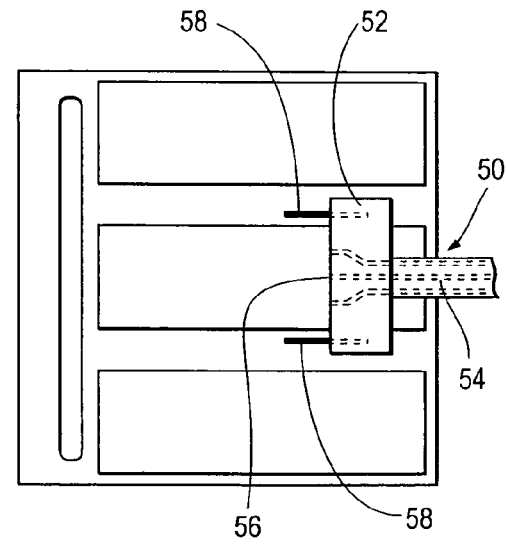
FIG. 3 is a top view of the cleaning device shown with a SFF connector positioned on one of the cleaning or work surfaces.

As will be recognized from the figures and the above description, the container 12 has a large, soft work surface 16 formed by a plurality of work surface portions or strips 16a-c attached to a face of the container 12. In that many fiber optic components benefit from the use of a combination of wet and dry cleaning methods, it has been observed that the work surfaces 16a-c allow both wet and dry cleaning methods to be performed. It has also been noted that the work surfaces 16a-c allow technicians to clean the male portion of SFF connectors by positioning the connectors with the pins straddling the strip 16b (as illustrated in FIG. 3) and using less-damaging large cleaning strokes rather than short, small cleaning strokes, which may cause scratching.

Figure 4:
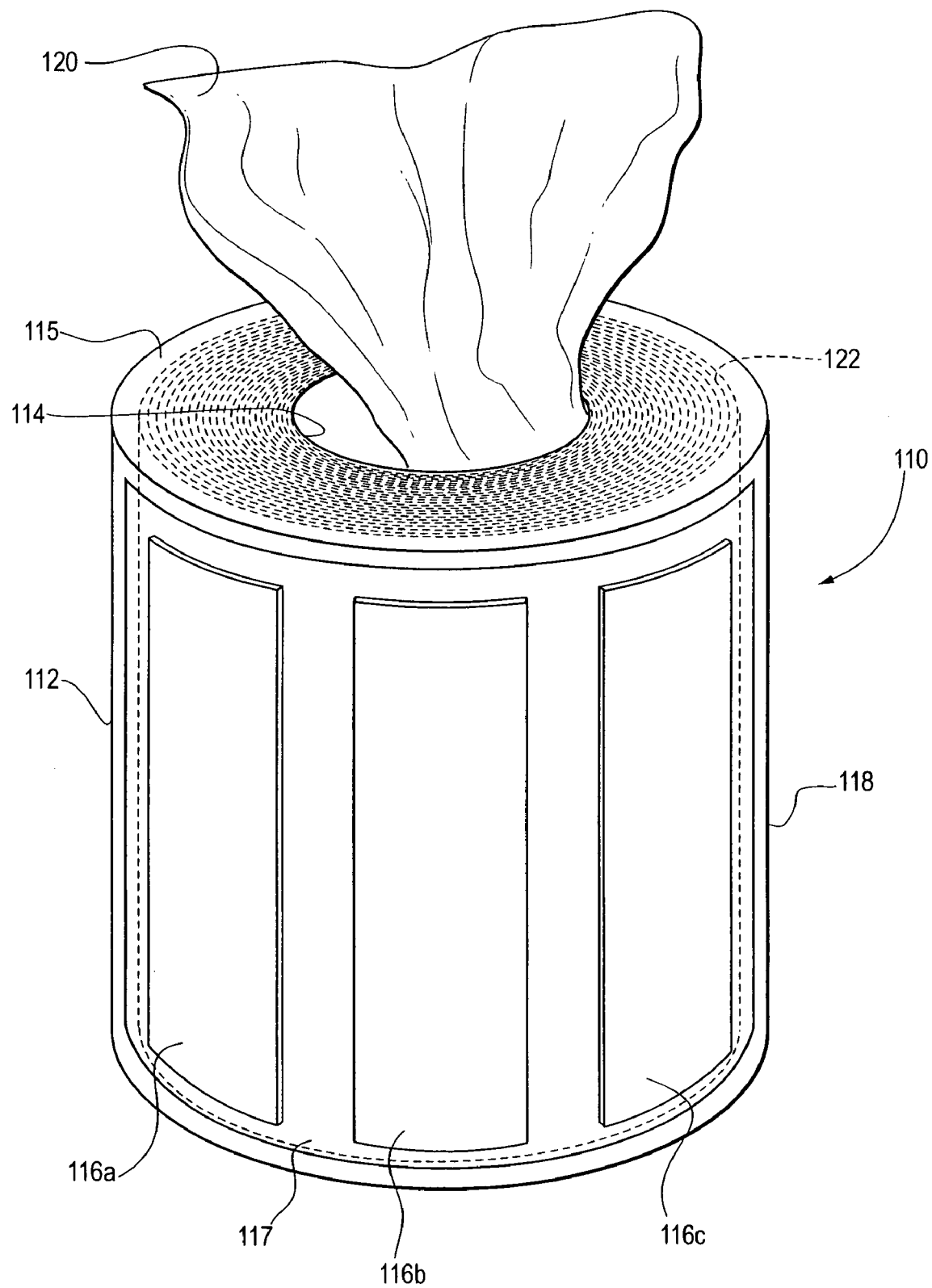
FIG. 4 is a perspective view of an alternate embodiment of the fiber optic component cleaning device.

An alternate embodiment of the cleaning device 110 is illustrated in FIG. 4. In this embodiment, the device 110 includes a container 112 formed having a tubular shape with an opening 114 at an end face 115 of the container 112. The wipes 120 are in a roll 122 disposed in the container 112 and are pulled (or spool) from the center of the roll 122 through the opening 114. The wipes 120 can be dry or pre-wetted. The opening 114 can include a resealable closure, such as a hinged cap (not shown) to close the opening 114 when not in use.

The container 112 includes a plurality of work surfaces 116a-c oriented longitudinally on the face or wall 118 of the container 112. The work surfaces 116a-c can be positioned on a larger or lower work surface 117 disposed on the container wall 118. Alternately still, the container can be made without the strips 116a-c and with only the underlying work surface 117, which can be formed from a suitable cleaning surface material, also in order to clean the optical fiber components. In a present cylindrical embodiment 110, the work surfaces 116a-c (and/or underlying surface 117) extends over about one-half to one-third of the wall or surface 118 of the container 112.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be effectuated without departing from the true spirit and scope of the novel concepts of the present invention. It is to be understood that no limitation with respect to the specific embodiments illustrated is intended or should be inferred. The disclosure is intended to cover by the appended claims all such modifications as fall within the scope of the claims.

What is claimed is:

1. A cleaning device configured for cleaning a male portion of an aligning-type fiber optic connector, comprising:
    a generally box-shaped container having a plurality of sides;
    a plurality of discrete soft, large work surfaces on a first side of the plurality of sides, the work surfaces being disposed in side-by-side relation to one another and having open regions therebetween at a elevation lower than an elevation of the plurality of work surfaces;
    an elongated slot-shaped opening in the first side of the plurality of sides of the container, the opening being adjacent to and extending along a first edge of the first side; and
    a plurality of cleaning wipes located inside the container, the wipes being fed from the inside of the container through the slot-shaped opening and placed on the work surfaces for cleaning.

2. The device in accordance with claim 1 wherein the container is formed of paperboard, cardboard, molded plastic, or electrostatic discharging material.

3. The device in accordance with claim 1 wherein the plurality of discrete work surfaces are disposed on a resilient surface extending over substantially all of the first side the container.

4. The device in accordance with claim 1 wherein the plurality of discrete work surfaces are formed of a non-limiting material.

5. The device in accordance with claim 4 wherein the plurality of discrete work surfaces are formed of a tight, closed cell material, or a covered open cell matrix.

6. The device in accordance with claim 5 wherein the plurality of discrete work surfaces are formed of neoprene.

7. The device in accordance with claim 1 wherein the plurality of cleaning wipes is placed on a roll.

8. The device in accordance with claim 7 wherein each of the plurality of cleaning wipes is detachable from adjacent cleaning wipes.

9. The device in accordance with claim 1 wherein the wipes are pre wetted.

* * * * *

UNITED STATES PATENT AND TRADEMARK OFFICE
CERTIFICATE OF CORRECTION

PATENT NO. : 7,552,500 B2  
APPLICATION NO. : 10/994929  
DATED : June 30, 2009  
INVENTOR(S) : Edward J. Forrest, Jr.

It is certified that error appears in the above-identified patent and that said Letters Patent is hereby corrected as shown below:

Claim 3, Column 6, Line 3 should read, "surface extending over substantially all of the first side of the"

Claim 4, Column 6, Lines 6-7 should read, "plurality of discrete work surfaces are formed of a non-linting material."

Claim 9, Column 6, Line 19 should read, "are pre-wetted."

Signed and Sealed this

Twenty-fifth Day of August, 2009

David J. Kappos  
*Director of the United States Patent and Trademark Office*